Sept. 23, 1924.  
H. C. McCLEARY  
WHEEL MOTOR FOR FOUR-WHEEL DRIVES  
Filed Sept. 27, 1923   4 Sheets-Sheet 3
1,509,737
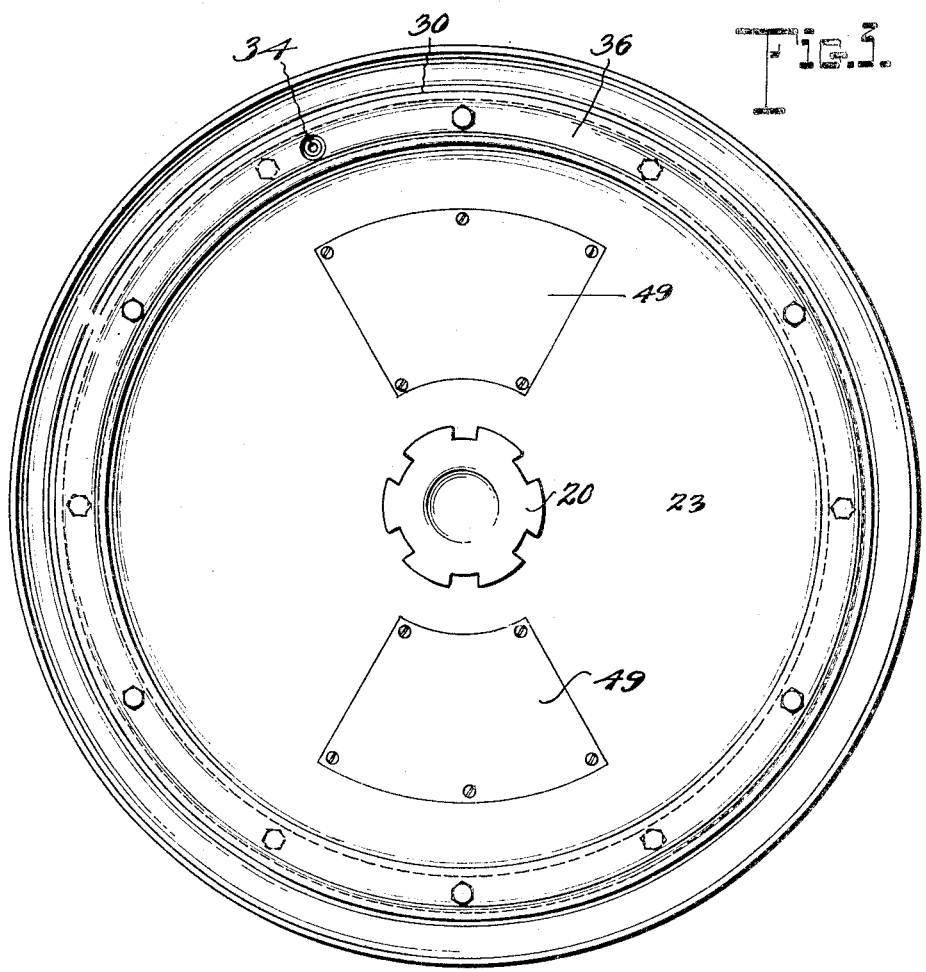
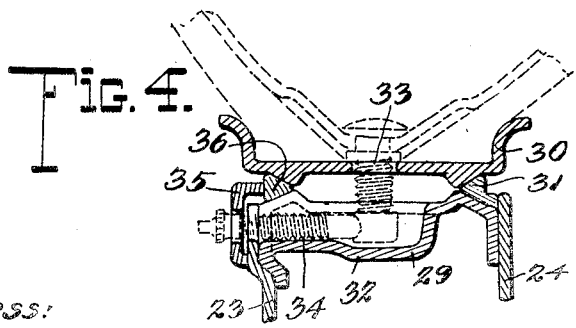

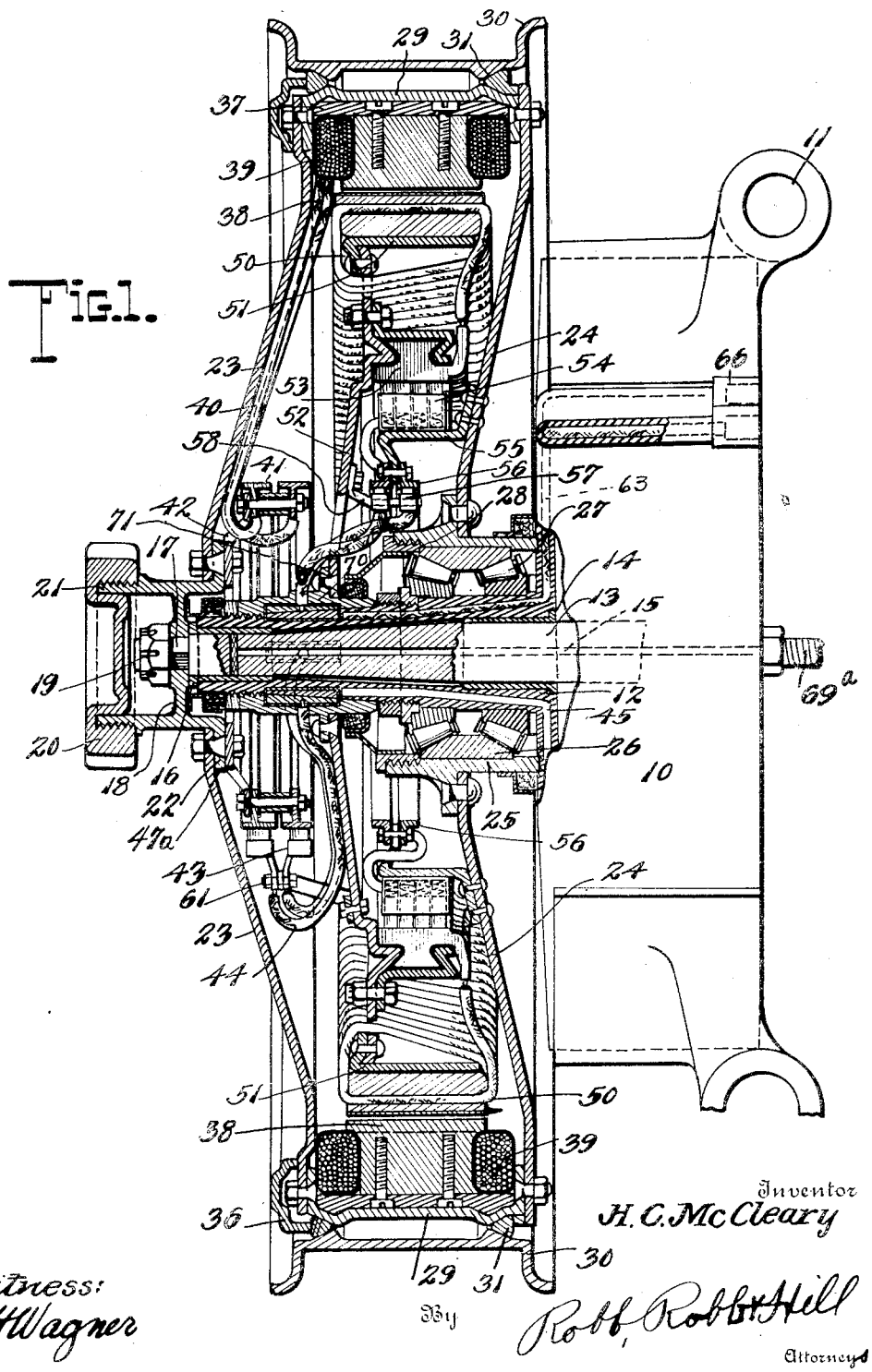

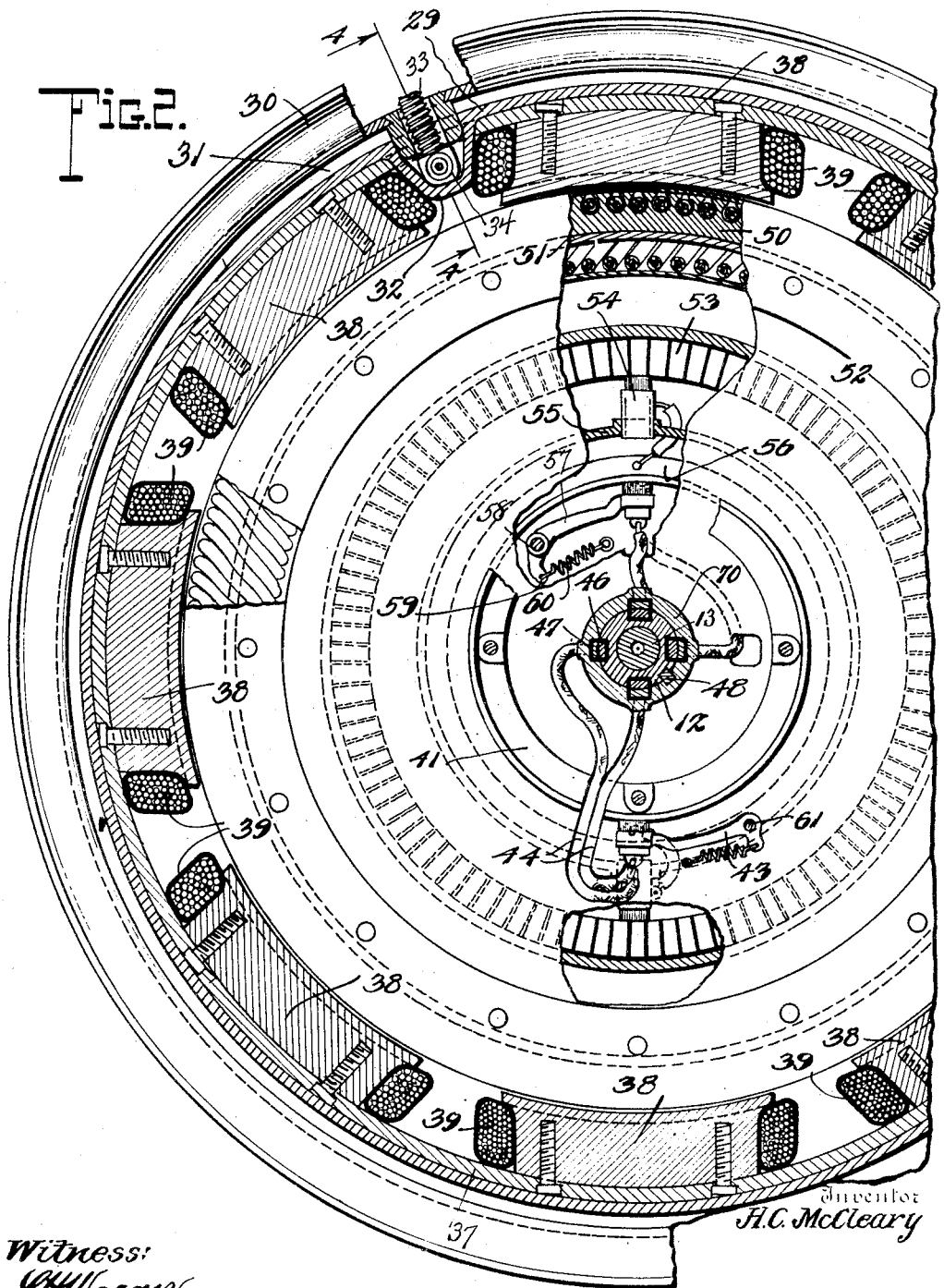

Sept. 23, 1924.  1,509,737
H. C. McCLEARY
WHEEL MOTOR FOR FOUR-WHEEL DRIVES
Filed Sept. 27 1923   4 Sheets-Sheet 4
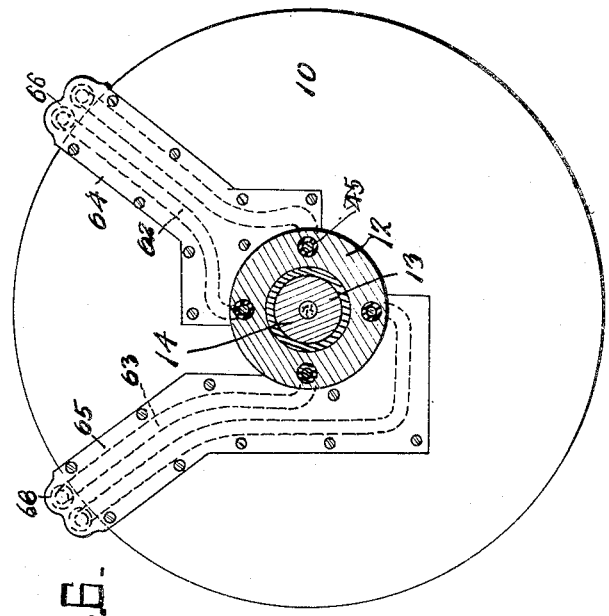
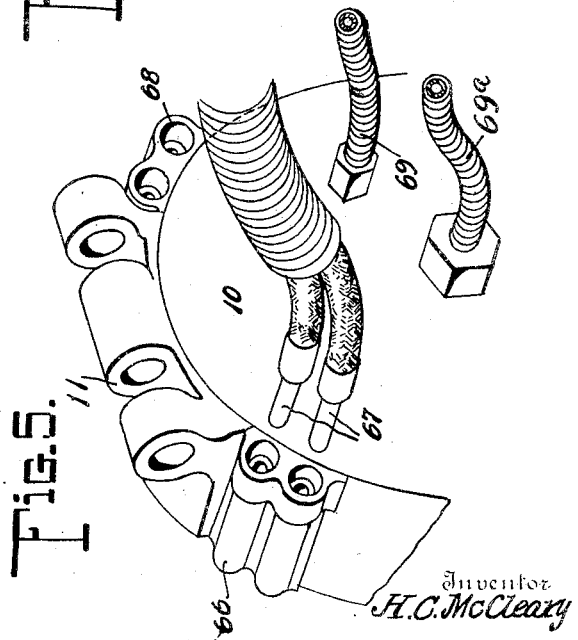
Witness:
Inventor
H. C. McCleary
By Robt, Robt & Hill
Attorneys Patented Sept. 23, 1924.

1,509,737

UNITED STATES PATENT OFFICE.

HARRY C. McCLEARY, OF WASHINGTON, DISTRICT OF COLUMBIA.

WHEEL MOTOR FOR FOUR-WHEEL DRIVES.

Application filed September 27, 1923. Serial No. 665,249.

*To all whom it may concern:*

Be it known that I, HARRY C. MCCLEARY, a citizen of the United States, residing at Washington, in the District of Columbia, have invented certain new and useful Improvements in Wheel Motors for Four-Wheel Drives, of which the following is a specification.

This invention relates to a wheel motor for four wheel drive, and particularly to a construction embodying separate electric driving units carried by the ground wheels of the vehicle and adapted to be controlled from a central point.

The invention has for an object to provide a novel and improved construction of electric driving mechanism comprising a wheel structure carrying a series wound field rotatable therewith and a relatively fixed armature, together with connections from a fixed part of the vehicle by which current may be constantly conducted to both the field and armature.

Another object of the invention is to provide an improved construction of wheel drive in which the series of field magnets are carried by the wheel felly and fed from a brush and ring connection disposed upon relatively fixed and movable parts, while the armature is supported upon a fixed part of the wheel and its commutator brush carried by a movable member thereof provided with a collecting ring disposed to establish circuit connections.

A further object of the invention is to present a novel construction of wheel adapted to receive electric driving means and comprising a hub disposed upon a rotatable axle and provided with conduits for electric wiring together with means carried by the wheel structure for engaging and rotating said axle for braking purposes.

Other and further objects and advantages of the invention will be hereinafter set forth and the novel features thereof defined by the appended claims.

In the drawings:—

Figure 1 is a vertical section through the assembled wheel;

Figure 2 is a section at substantially a right angle to Figure 1, with parts broken away;

Figure 3 is a side elevation of the wheel casing;

Figure 4 is an enlarged detail section on line 4—4 of Figure 1;

Figure 5 is a detail perspective of the brake casing; and

Figure 6 is a vertical section at the inner face of the brake drum.

Like numerals refer to like parts throughout the several figures of the drawing.

This invention is adapted for application in different types or characters of wheel or automobile construction and is herein disclosed in connection with a four wheel drive and supported from a spring suspension, substantially as claimed in my co-pending application filed August 7, 1923, Serial Number 656,269. In this presentation of the invention the numeral 10 represents the brake drum or casing provided with the ears 11 for spring suspension, as in said application, and this drum is formed with a hub portion 12 within which a stub axle 13 is rotatably mounted within the bushing 14. This axle is designed for cooperation with a suitable braking mechanism and is formed with a passage 15 for a lubricant. The outer end of the axle is provided with a cooperating bushing 16 within the hub and provided with a squared or angular portion 17 by which the axle is rotated by means of a plate 18 having a cooperating aperture and clamped in position upon the axle by a nut 19 as shown in Figure 1. This structure may also be provided with a hub cap 20 threaded upon a cylindrical portion 21 from the plate 18 and such portion is formed with a flange 22 suitably secured to the side disk or wall 23 forming part of the rotatable wheel structure. The inner wall 24 of this structure is secured to a casing 25 provided with a bearing ring 26 adapted to cooperate with roller bearings 27 of any usual type secured upon the hub by means of the clamp nut 28. The peripheries of the side disks or plates 23 and 24 are connected by a felly plate 29 suitably secured thereto and adapted for the connection of a tire rim 30 of the usual character.

For the purpose of securing this tire rim 30 in position it is formed with the usual wedge faces 31 and the felly plate 29 is provided with an inwardly depressed portion 32 adapted for the connection of an air intake, as indicated by dotted lines in Figure 4. In this form the air tube 33 from the tire is formed with an angular section 34 extending outward through the depressed portion 32 and passes through an aperture in the outer clamping ring 35 which carries the removable clamping member 36 for the tire rim.

The felly plate 29 supports a plurality of field magnets which are preferably series wound and carried by a plate 37 supported from the felly plate as shown in Figures 1 and 2. These field magnets comprise the core 38 and the field winding 39 surrounding the same, said windings of the independent magnets being connected in circuit in the usual manner to properly energize the successive field magnets of the series. This field winding may be supplied with current through any suitable connections, a desirable form being shown as comprising the conductors 40 extending therefrom to the collecting rings 41 which are carried by a bracket 42 rotatable with the wheel, as in Figures 1 and 2.

Cooperating with the rings 41 are a plurality of proper brushes 43 for establishing contact therewith and connected to conductors 44 extending to the fixed hub. This hub is formed with longitudinally extending conduits 45 to receive the conducting wires which terminate at a wedge-shaped conductor plate 46 which is contacted by a cooperating plate 47 carried by the collar 47ª, so that when these plates are slipped into engagement a constant circuit is established therethrough.

A proper number of these plates is provided for the current feed desired; for instance, as shown in Figure 2 four plates are used to provide the two circuit connections each for the field magnets and armature. This arrangement is particularly desirable since it permits the complete removal of the wheel from the hub without disengaging any of the electrical connections and insures a proper re-engagement in contacting position when the wheel is restored. For the latter purpose it is desirable to provide a guide key 48 as shown in Figure 2. For the purpose of permitting access to these electrical connections the outer plate 23 of the wheel may be provided with apertures having suitable closures 49 readily removable for that purpose.

The commutator 50 is wound in the usual manner in this art and is supported by a ring 51 stationarily held by brace members 52 secured at their inner ends to a flange 71 of the collar 70. The ring 51 also supports a commutator 53 in fixed position and the cooperating brushes 54 travelling upon the same are carried by a support 55 extending from the side plate 24 of the wheel structure so as to be rotatable therewith. This support also carries collecting rings 56 with which the brushes 57 cooperate. These brushes may be mounted upon a pivot 58 extending from the braces 52 and suitably tensioned by means of a lever arm 59 and cooperating spring 60. The brushes 43 before described are also similarly mounted upon the pivot arm 61 as shown in Figure 2.

For the purpose of conducting the current to the axle conduits 45, the outer face of the brake casing 10 is provided with conduits 62 and 63 for the wiring connections, these being provided with cover plates 64 and 65 respectively. The conduits 62 communicate with suitable plug sockets 66 upon the periphery of the brake drum adapted to receive the connecting plugs 67 while the conduits 63 communicate with similar sockets 68 for the same purpose, as shown in Figures 5 and 6. The brake drum is provided with connections 69 for a fluid pressure brake system, and 69ª for the lubricating system.

The construction of wheel motor before described is particularly adapted for a four wheel drive in which the wheels are independently actuated by the motors carried thereon, and in order to adapt this construction for a reversal of the motor independent circuit lines are carried to the field and armature of the motor so that one of said lines may be reversed in polarity for that purpose.

The construction of motor described provides for the independent feeding of the armature and field while the location of this field at the periphery of the wheel provides the most efficient driving action and disposes the parts so that the danger of disarrangement and short circuiting is materially reduced while the armature member and its commutator being mounted upon a relatively fixed part are not subject to the conditions incident to the rotation of the wheel and the brushes for said armature are positively controlled in the movement of the wheel, thus securing stability and close nesting of the various driving members all within a common vertical plane.

The circuit conductors extending through the fixed hub and collecting rings provide means for a positive electrical connection not liable to accidental breakage and so disposes the collecting rings concentric to the hub that their feeding action is constantly maintained under various conditions of use. The mounting of the wheel for rotation upon the hub and for a driving action of the axle within the hub provides for a braking action upon the wheel by any preferred type of brake mechanism. The invention therefore presents a very efficient form of wheel motor designed for control by the ordinary operator and in which the wheel and its motive parts may be readily removed from the axle and access secured for the purpose of replacement or repair whenever necessary.

While the specific construction of the motor has been herein disclosed, the invention is not confined thereto as changes and alterations may be made without departing from the spirit thereof as recited in the following claims.

Having thus described my invention, what I claim as new and desire to secure by Letters Patent is:

1. In an electric wheel motor, a wheel casing, a series wound field carried at the felly portion thereof, an armature disposed upon a relatively fixed member within the wheel, collecting rings rotatable with the casing for both the field and armature, co-operating brushes upon the fixed member for establishing circuits to said rings, an axle, a fixed supporting hub thereon provided with conductor conduits, and conductors from said hub to said brushes.

2. In an electric wheel motor, a supporting hub, a rotatable axle within the same, a wheel casing rotatable upon said hub and connected to said axle to impart rotation thereto, and cooperating field and armature members carried by the casing and hub.

3. In an electric wheel motor, a supporting hub, a rotatable axle within the same, a wheel casing rotatable upon said hub and connected to said axle to impart rotation thereto, a series wound field carried by said casing, and a cooperating armature mounted upon said hub.

4. In an electric wheel motor, a supporting hub, a wheel casing rotatable thereon, a series wound field carried at the outer portion of said casing, an armature disposed within said field and fixedly supported from said hub, commutator brushes for said armature carried by the rotatable wheel casing, a collecting ring carried by said casing, and conductors leading from said hub to brushes cooperating with said ring.

5. In an electric wheel motor, a wheel casing comprising opposite plates, a felly plate connecting the periphery thereof, a series of field magnets mounted upon said felly plate, a fixed hub provided with conductor conduits therethrough, an armature support mounted on said hub, an armature carried by said support to cooperate with said field magnets, and a rotatable commutator member carried by the wheel casing and provided with circuit connections to said hub.

6. In an electric wheel motor, a wheel casing comprising opposite plates, a felly plate connecting the periphery thereof, a series of field magnets mounted upon said felly plate, a fixed hub provided with conductor conduits therethrough, an armature support mounted on said hub, an armature carried by said support to cooperate with said field magnets, a collecting ring carried by said casing, a pivoted brush carrier mounted upon the armature support, and a spring for tensioning said brush toward said ring.

7. In an electric wheel drive, a fixed hub provided with electric conduits terminating in conductor plates, a collar supported upon said hub and having cooperating conducting plates slidingly mounted upon the hub, a wheel casing rotatable upon the hub and carrying a series wound field, and an armature within said casing supported from said collar to cooperate with said field.

8. In an electric wheel drive, a fixed hub provided with electric conduits terminating in conductor plates, a collar supported upon said hub and having cooperating conducting plates and slidably mounted upon the hub, a wheel casing rotatable upon the hub and carrying a series wound field, an armature within said casing supported from said collar to cooperate with said field, and conductors extending from said collar contact plate to a commutator device carried by the rotatable wheel.

9. In an electric wheel drive, a wheel casing comprising opposite plate members, an annular felly plate connecting said members and provided with a depressed chamber therein adapted to receive an air intake connection, field magnets secured directly to said plate at opposite sides of said chamber, a cooperating fixed armature within the wheel casing, and a tire rim adapted to be clamped upon said felly plate and having an air inlet opening communicating with said chamber.

10. In an electric wheel drive, a brake casing provided with a rigid hub member extended therefrom and formed with conducting conduits extending longitudinally of the hub and radially of the brake casing to the peripheral surface thereof, a wheel structure mounted upon said hub, electric driving elements within said structure, and circuit connections from said elements to said hub conduits.

11. In an electric wheel drive, a brake casing provided with a rigid hub member extended therefrom and formed with conducting conduits extending longitudinally of the hub and radially of the brake casing to the peripheral surface thereof, a wheel structure mounted upon said hub, electric driving connections within said structure, circuit connections from said elements to said hub conduits, a rotatable axle mounted within said hub, a bushing disposed between said axle and hub, and an angular connection between the outer end of said hub and said wheel axle to impart rotation to said axle.

12. In an electric wheel drive, a fixed hub, a wheel casing mounted thereon and comprising opposite plates, a peripheral felly connecting said plates, a series wound field carried by said felly, a relatively fixed armature supported upon said hub, an angularly disposed plate from the inner wheel plate and provided with commutator brushes mounted thereon, collector rings carried by the free edge of said angular plate, and a circuit connection with said rings.

13. In an electric wheel drive, a fixed hub, a wheel casing mounted thereon and comprising opposite plates, a peripheral felly connecting said plates, a series wound field carried by said felly, a relatively fixed armature supported upon said hub, an angularly disposed plate from the inner wheel plate and provided with commutator brushes mounted thereon, collector rings carried by the free edge of said angular plate, a circuit connection with said rings, collecting rings supported by the outer wheel plate and in circuit with the field, and cooperating brushes supported by a fixed member upon said hub.

In testimony whereof I affix my signature.

HARRY C. McCLEARY.